United States Patent

Reuber et al.

Patent Number: 5,542,772
Date of Patent: Aug. 6, 1996

[54] ARTICULATED JOINT FITTING FOR AUTOMOTIVE VEHICLE SEAT

[75] Inventors: Gerhard Reuber, Drolshagen; Hans G. Menne, Bergneustadt; Gavriel Shafry, Meinerzhagen, all of Germany

[73] Assignee: Alfred Teves GmbH & Co oHG, Bergneustadt, Germany

[21] Appl. No.: 277,777

[22] Filed: Jul. 20, 1994

Related U.S. Application Data

[63] Continuation of Ser. No. 915,690, Jul. 21, 1992, abandoned.

[30] Foreign Application Priority Data

Nov. 22, 1990 [DE] Germany ............... 40 37 057.7

[51] Int. Cl.⁶ ........................... F16C 11/00
[52] U.S. Cl. .............. 403/97; 403/96; 403/325; 297/362
[58] Field of Search ............ 403/97, 98, 99, 403/107, 92, 93, 96, 325, 343; 297/362

[56] References Cited

U.S. PATENT DOCUMENTS

| | | |
|---|---|---|
| 4,025,109 | 5/1977 | Klingelhöfer et al. . |
| 4,469,376 | 9/1984 | Pelz .................... 297/362 |
| 4,470,633 | 9/1984 | Fourrey ................ 297/362 |
| 4,504,091 | 3/1985 | Ohshiro . |
| 4,598,947 | 7/1986 | Fourrey et al. ........... 297/362 |
| 4,715,656 | 12/1987 | Walk ................... 297/362 |
| 4,781,416 | 11/1988 | Johnson ............... 297/362 |

FOREIGN PATENT DOCUMENTS

| | | |
|---|---|---|
| 0410850 | 1/1991 | European Pat. Off. . |
| 2050733 | 4/1971 | France . |
| 2201622 | 4/1974 | France . |
| 2398637 | 2/1979 | France . |
| 2724637 | 12/1978 | Germany ............... 297/362 |
| 2734565 | 2/1979 | Germany . |
| 3022456 | 1/1982 | Germany ............... 297/362 |
| 3129672 | 10/1982 | Germany . |
| 3241088 | 6/1983 | Germany . |
| 3529887 | 3/1987 | Germany . |
| 8705554 | 6/1987 | Germany . |
| 3701639 | 8/1988 | Germany . |
| 3709403 | 9/1988 | Germany . |
| 3723204 | 1/1989 | Germany . |
| 3726433 | 2/1989 | Germany ............... 297/362 |
| 3800765 | 7/1989 | Germany . |
| 3916673 | 11/1990 | Germany . |
| 39 16 673.2 | 11/1990 | Germany . |
| 2107386 | 4/1983 | United Kingdom ....... 297/362 |
| 2219735 | 12/1989 | United Kingdom . |

*Primary Examiner*—Jack W. Lavinder
*Assistant Examiner*—James Miner
*Attorney, Agent, or Firm*—Robert P. Seitter; J. Gordon Lewis

[57] ABSTRACT

The invention is related to an articulated joint fitting preferably for automotive vehicles with a wobble gearing to create a swivelling motion of the joint parts. As a development of the articulated joint fitting, a reduction of costs is achieved in that the spur gear wheel is composed of a plurality of elements and a simplified adjustment of the eccentric with respect to one of the articulated joint fittings is attained.

23 Claims, 4 Drawing Sheets

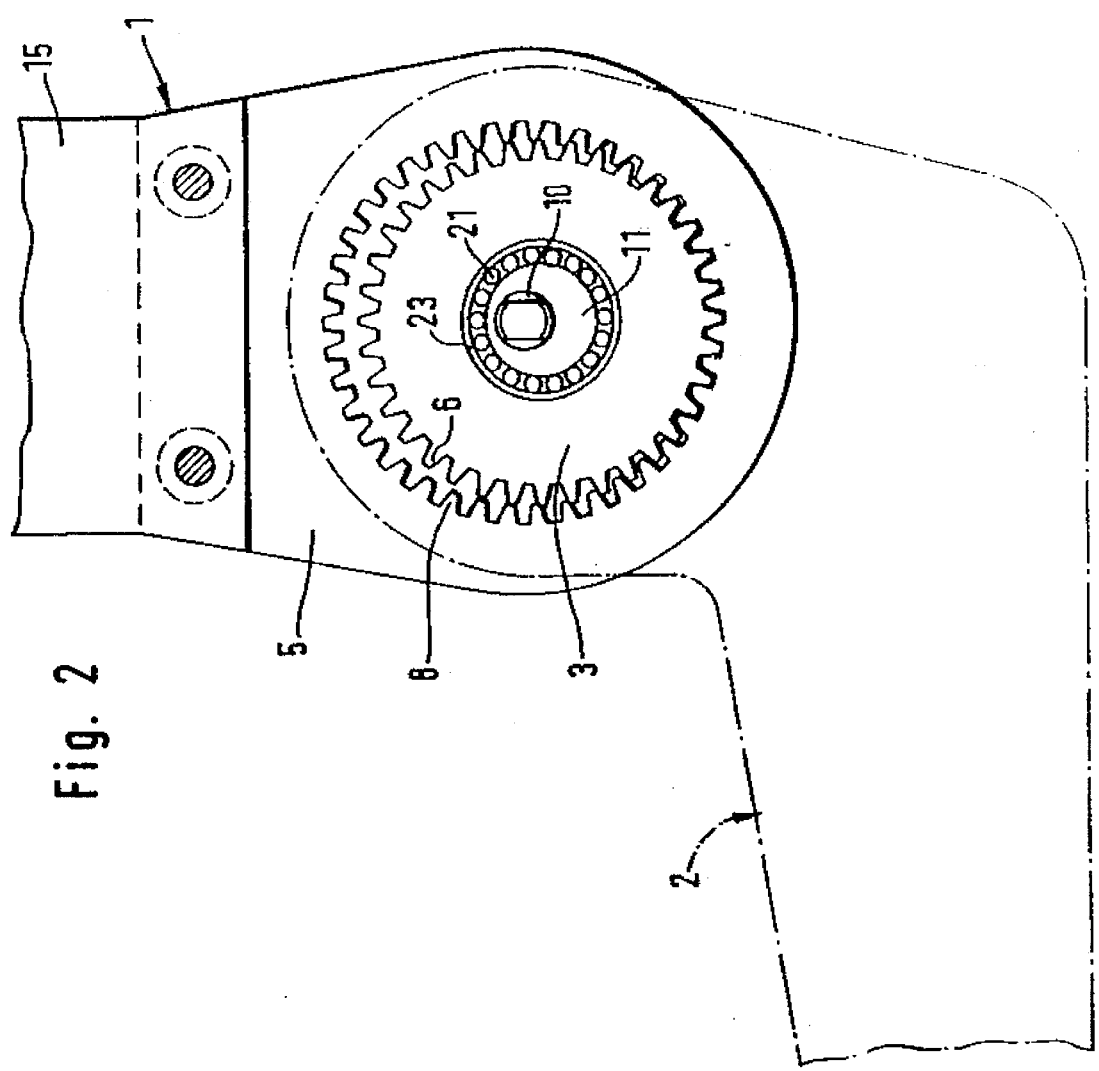
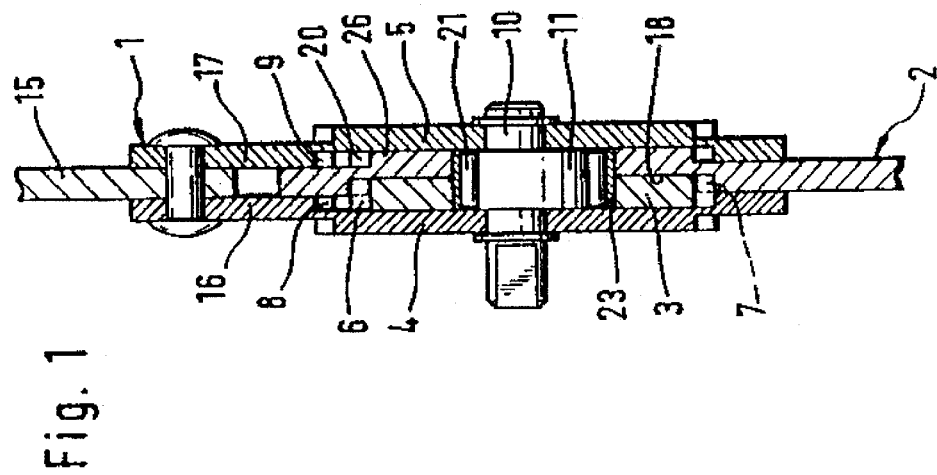

ARTICULATED JOINT FITTING FOR AUTOMOTIVE VEHICLE SEAT

This is a CONTINUATION of application Ser. No. 07/915,690, filed on Jul. 21, 1992 now abandoned.

FIELD OF THE INVENTION

The invention is related to an articulated joint fitting for automotive vehicle seats.

BACKGROUND OF THE INVENTION

An articulated joint fitting of this type of hinge includes a gear wheel designed on one piece with the hinge part and the gear wheel projects axially beyond the hinge part on one side. The gear wheel meshes with inside teeth on the other part of the hinge. The known hinge is susceptible to transverse forces and torsion about the longitudial axis of the hinge parts due to the asymmertrical design. The asymmertical design of the hinge also requires a complicated axial mount.

Another known hinge has a gear wheel mounted on a cam so that it engages with inside teeth on hinge parts that surround the gear wheel axially from one side. However, in this case the ring of the inside teeth have different numbers of teeth and are each designed to a different part of the hinge. The gear wheel is not connected to any hinge part but instead serves only to make the two hinge parts that have inside teeth rotate with respect to each other.

It is the object of the invention to improve an articulated joint fitting of the forementioned type, in particular, to allow it to be manufactured at low cost and to improve its function.

SUMMARY OF THE INVENTION

The invention substantially consists therefore in foregoing the use of a spur gear wheel, being comparatively expensive as to its manufacture and relatively sizeable in width, and to substitute said spur gear wheel with at least two elements which are cheaper to manufacture since they can be fabricated, for example, by stamping them out of a metal sheet.

A further simplification and less expensive manufacture will be achieved by the use of a deepened recess (outward offset) in the second joint part by a pressing operation, where the outer contour of the outward offset corresponds to the outside contour of the gear wheel. When and if the gear wheel projects with part of its external toothing beyond the recess, then, on one hand, a simple and firm coupling is obtained between the gear wheel and the second joint part and, on the other hand, the projecting external toothing will serve to engage the internal toothing of the second joint part.

In this context, an improvement by a reduction of the flank strain is attained. According to these teachings, the external toothing is realized, for one part, by the projecting teeth of gear wheel and, for the other part, by a corresponding external toothing of the outward offset in the second joint part. Both the first section and the second section will be furnished with an internal toothing in a construction of this kind. Due to the internal toothing, the two sections of the first joint part can be shifted relative to each other by rotating them angularly, the external toothing having been inserted beforehand, so that in this instance a balance of tolerances is achieved in a simple manner.

If a recess is desired, then, as an alternative, two gear wheels can be applied symmetrical to each other and can be inserted in two recesses which are corresponding to each other. This will lead to an external toothing which is composed of the two toothings of two gear wheels projecting from the recesses and which works out to have the same effect as a wide-shaped spur gear wheel which is inserted in the second joint part.

In that case, the advantage of the aforesaid two narrower gear wheels is to allow the parts to be manufactured more cheaply by a stamping operation.

Along the lines of a further development, the two recesses can be combined to form a through opening into which either one gear wheel only can be inserted from the one side or, else, two gear wheels being positioned symmetrically relative to each other can be inserted from either side. Alternatively, an arrangement of the two gear wheels which is unsymmetrical with respect to the surface of the second joint part can be envisaged if this should be required.

When the gear wheel or the gear wheels are being inserted into the recess, respectively into the through opening it will be recommended to apply a further development of the inventive thought. Since the stamped inward offset in the material presents narrower and more pronouncedly curved flanks of the external toothing, the external toothing bearing the stamped inward offset leads to a smoother run of the gear wheel. Preferably, the stamped inward offset of the recess, respectively of the outward offset in the second joint part will be positioned outwardly, so that the external toothing so formed will run more smoothly on the internal toothing associated with it.

An improved adjustment of the articulated joint fitting will allow to be achieved by the driving shaft supported longitudinally slidably and non-rotatably relative to the eccentric and in that means are provided which adjust the eccentric in the event of a longitudinal slide of the driving shaft. These provisions constitute an improvement in general terms for an articulated joint fitting of the kind mentioned in the beginning. The possibility of adjustment and of a balance of tolerances which will so be created can either substitute the provisions of a balance of tolerances by an angular rotation of the two sections or, on the other hand, it can advantageously supplement such provisions. Due to the described radial adjustment of the eccentric the latter will constantly be maintained in a force-locking engagement with the sector of the gear wheel, respectively of the external toothing whose teeth are in engagement so that the tolerances to be specified are comparatively gross and, thus, the manufacturing cost will be low.

Along the lines of another development of the invention the elements are formed by a wedge which is coupled to the shaft and which interacts with an internal surface of the eccentric being associated with the wedge and preferably inclined so as to correspond to the slant of the wedge are recommended as an adjusting means. In this conjunction, it will be of importance to consider the further development of the inventive teachings where the support of the eccentric on the driving shaft is furnished with a play in radial direction in order to make sure that the eccentric is given a sufficient possibility of a radial slide. The wedge effect points therewith into the direction of the maximum eccentricity of the eccentric, whereby the wedge effect is optimized.

In order to avoid a readjustment when this is required, it will be recommended to apply the combination of features where spring means are provided which tend to pull the driving shaft into a direction in which the shaft is maintained in a force-locking engagement with the eccentric representing a further development of the invention, by which the shaft is constantly pulled into a direction in which the eccentric keeps the gear wheel in engagement with the internal toothing.

Particularly simple-design adjusting means are indicated in that the wedge is coupled to the shaft so as to form one piece with it and in that the wedge-and-shaft assembly is cut from a steel section which has a cross-sectional surface matching the contour composed of the shaft and the wedge, any rotation of the eccentric on the driving shaft being, advantageously, prevented in a shaft.

BRIEF DESCRIPTION OF THE DRAWINGS

One embodiment of the invention will be described in the following with reference to the Figures, in which:

FIG. 1 shows a first embodiment of an articulated joint fitting in a sectioned representation;

FIG. 2 shows a side view of the articulated joint fitting in FIG. 1;

DETAILED DESCRIPTION OF THE PREFERRED AND ALTERNATIVE EMBODIMENTS

Figure 3:
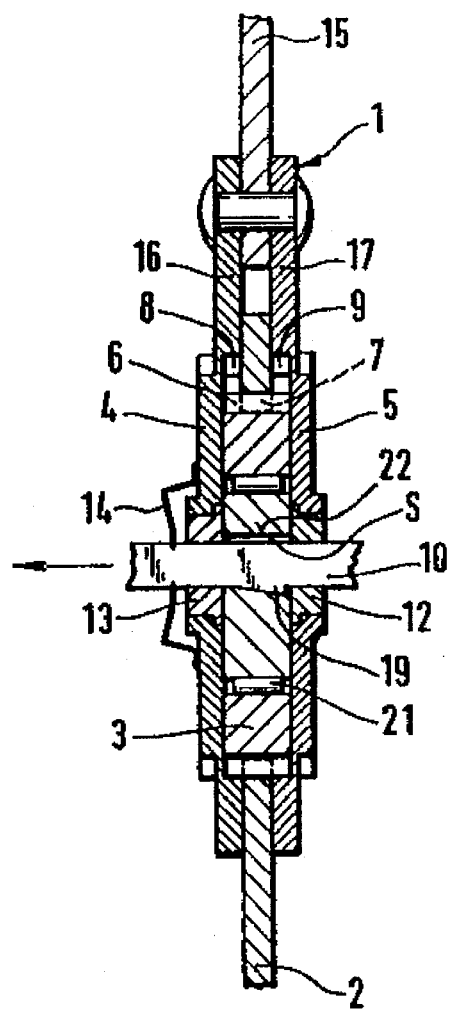
FIG. 3 shows a second embodiment with automatic adjustment.

This type of hinge typically includes a hinge for a motor vehicle seat having two parts that can be pivoted toward each other, in which inside teeth are provided for the first part of the hinge and outside teeth are provided for the second part of the hinge. The inside teeth mesh with the outside teeth. The outside teeth have a smaller number of teeth and a smaller head circle diameter than the inside teeth. Both parts of the hinge are mounted on a drive shaft with a cam. An especially stable hinge is obtained by having the outside teeth designed in the form of a gear wheel that is connected to the second part of the hinge and is mounted on the cam and projects axially beyond the second part of the hinge on both sides, with identical inside gear teeth being provided on two sections of the first part of the hinge surrounding the spur-tooth wheel. In order for the direction of rotation of the drive shaft to correspond to the pivoting motion of the back rest, it is appropriate for the second hinge part to be used for the seat and the first hinge part to be used for the back rest. Due to the tension between the two sections of the first hinge part with respect to each other, the play in the hinge can be minimized. This makes it possible to eliminate manufacturing tolerances in an especially simple manner. A particularly great stability with respect to twisting about the longitudinal axis of the hinge parts is achieved by the fact that the sections are designed in the form of discs and their outer radical areas are in contact with the second part of the hinge.

The hinge has a first hinge part 1 that is attached to a back rest. The seat itself is attached to the second hinge part 2. The second hinge part 2 has an opening in the form of a gear wheel punched out of it. A gear wheel 3 of the same shape as the gear wheel but a slightly larger width and having outside teeth 6 is pressed into the ring of inside teeth 7 formed in the second hinge part 2 . Gear wheel 3 has a greater width than the second hinge part 2 and is arranged in the latter in such a way that it projects axially by the same extent on both sides. Gear wheel 3 is mounted by means of a roller bearing on cam 11 which is arranged on drive shaft 10.

The disc-shaped sections 4 and 5, connected to the first hinge part 1 by means of a rivet connection, are in contact with the end faces of the cam . Sections 4 and 5 are identical and each has inside teeth 8 and 9 whose head circle diameter is larger than that of the outside teeth 6 of gear wheel 3 and inside teeth 20 on the second hinge part 2. The number of teeth in the ring of inside teeth 8, 9 is greater than the number of teeth in the ring of outside teeth 6 and 20. The outer radial areas of sections 4 and 5 are in axial contact with the first hinge part 1. Cam 11 is in a position so that the outside teeth 6 of gear wheel 3 are engaged with an area of the inside teeth 8 over a certain length. On the opposite side, there is a distance between the head circles of the outside teeth 6 and the inside teeth 8. When the drive shaft 10 is rotated, gear wheel 3 engages with the inside teeth 8 of section 4 due to the forced eccentric movement. Due to the number of teeth, hinge parts 1 and 2 are pivoted with respect to each other by a specified angle. FIGS. 1 and 2 show a first joint part with a holding element 15 which is preferably coupled to the backrest of an automotive vehicle seat. This articulated joint fitting 1 is associated with a holding element 15 which is riveted or coupled in another manner, for example, by spot-welding, to a first fitting cover 16 and to a second fitting cover 17. At the first and second fitting covers 16, 17, a first section 4 and second section 5, are respectively positioned and are formed by hobbed depressions in the fitting co-covers 16, 17. At their internal edge surface the depressions have a tooth-shaped contour so that two internally toothed elements 8, 9 result which serve as an internal toothing of the fitting housing.

Since the depressions are formed by an appropriate pressing operation the toothing continues on the outer edge of the depressions in the shape of an external toothing, which in the embodiment under review is, however, of no particular importance.

The second joint part 2 projects into the fitting housing and presents a recess 18 with an internal toothing within the inner space of the housing which is engaged by a gear wheel 3 having a matching external toothing. Since the width of the gear wheel 3 is larger than the depth of the recess 18, part of the gear wheel will project beyond the front face of the second housing part and will consequently be available as an external toothing on the left side of the second joint part 2 as viewing FIG. 1.

Since the recess 18 has originated from a pressing operation the mold has been selected such that the outward offset 26 forms an external toothing 20 which is aligned with the external toothing 6 of the gear wheel 3 so that on the right side of the first joint part, too, an external toothing exists.

Consequently, the external toothings 6 and 20 will act the same way as the spur gear wheel which is described in the patent application mentioned in the beginning in conjunction with the second joint part 2.

By means of a roller bearing 21 which is surrounded by a bush 23 the second joint part 2 provided with an external toothing is rotatably supported on an eccentric 11 which is supported, in its turn, in corresponding cutouts of the first and of the second sections 4, 5 by means of a shaft 10. The eccentric 11 is non-rotatably coupled to the shaft 10 and may be fabricated to form one piece with the latter if this is found convenient.

The mode of functioning corresponds to that described above insofar as through the external surface of the eccentric the external toothing 6, 20 is pressed into the internal toothing 8, 9. On account of the different numbers of teeth between the external toothing and the internal toothing the angle between the first and the second joint parts 1, 2, as shown in FIG. 2, will change depending on the revolutions of the shaft 10 at which angle the parts perform a swivelling motion relative to each other in the plane of FIG. 2. A longitudinal movement of the fitting covers 16, 17 is prevented by circlips or retaining rings on the shaft 10 which are not described in more detail. It goes without saying that for the method of operation of the articulated joint fitting it will be of importance that the diameter of the internal toothing is larger than the diameter of the external toothing as becomes clearly visible from FIGS. 1 and 2, so that the outside teeth engage the internal teeth only locally (at the bottom end of the external toothing in FIGS. 1 and 2).

By rotating and by bracing the fitting covers 16 and 17 respectively relative to each other during assembly and, precisely speaking, before coupling the play of the fitting will be eliminated or greatly reduced in a particularly simple way.

Now, FIG. 3 illustrates the possibility of an automatic adjustment of the internal toothing relative to the external toothing, a wide-size spur gear wheel is used in this instance, in combination with an external toothing composed of a plurality of elements. The embodiment shown in FIG. 3 illustrates a construction like that described in connection with FIGS. 1 and 2 of the forementioned patent application. The major difference consists, now, in that the manufacture of the eccentric and the adjustment are to be simplified. For this purpose, the square driving shaft 10 is supported longitudinally slidably and non-rotatably with respect to the eccentric 11. The driving shaft 10 is formed with a wedge-shaped attachment 19 which with its outside inclined surface is associated with a corresponding inclined surface of a through aperture 22 being substantially square-shaped of the eccentric 11. On the surface of the driving shaft 10 facing away from the wedge 19 a slot S exists between the inside surface of the through aperture 22 and the outside surface of the shaft 10. When the shaft 10 is pulled in the direction of the arrow in FIG. 3, then the eccentric 11 will, therefore, move downward and, thus, in the direction of a force-locking engagement by the gear wheel 3 (in the direction of increasing eccentricity) whose external toothing will, correspondingly, engage the internal toothing of the second joint part 2.

The two bushings 12, 13 for supporting the shaft 10 offer the possibility to introduce the shaft 10 provided with the wedge 19 into the housing formed by the covers 16, 17, that is to say, between the sections 4 and 5 of the fitting covers 16 and 17. They will simultaneously constitute a pivot bearing for the square shaft 10 with respect to the housing 16, 17.

Through a groove the spring 14, which is illustrated symbolically, urges the shaft 10 in longitudinal direction and therewith adjusts the eccentric 11 in radial direction.

Figure 4:
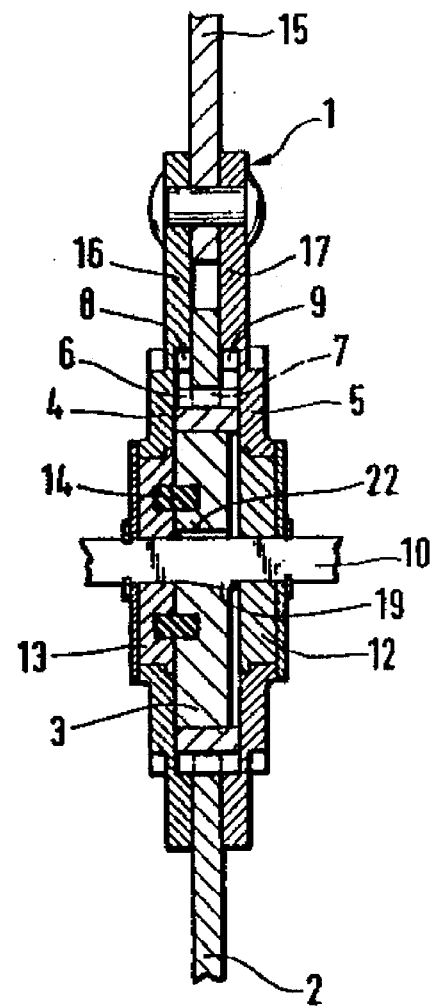
FIG. 4 shows a third embodiment with automatic adjustment.

Another possibility of adjustment is visible in the embodiment according to FIG. 4, in which the eccentric 11 is prestressed in the longitudinal direction of the shaft 10 by means of an annular spring element 14, the effect of the spring element 14 tending to slide the eccentric to the right so that it urges the gear wheel still more downward and so keeps it engaged with its external toothing in the internal toothing of the second joint part. The bushings 12 and 13 serve again to pivot the shaft 10, the bushings being retained in the longitudinal direction of the shaft 10 by means of circlips or retaining clips and sealing plates. In FIG. 4 the eccentric will, thus, be slid instead of the shaft.

Figure 5:
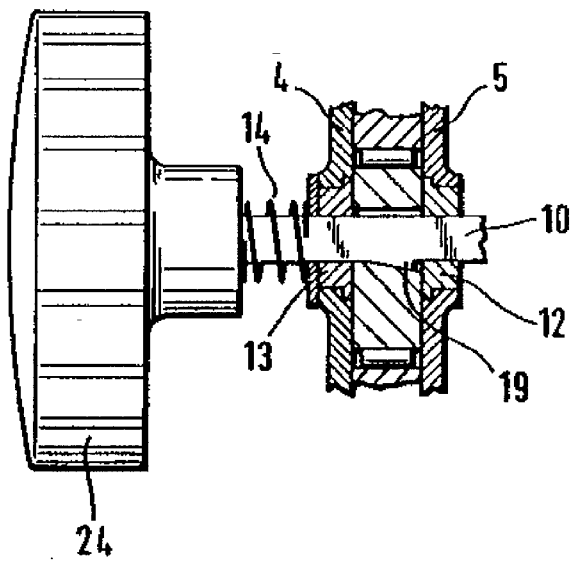
FIG. 5 shows the adjustment by an elastic longitudinal slide of the shaft in FIG. 3 in a symbolic representation.

FIG. 5 shows a possibility of manual actuation of the inventive articulated joint fitting in which the spring element 14 prestresses a rotary knob 24 in the longitudinal direction of the shaft 10, thus maintaining the effect of the wedge 19 which has been described above. By an appropriate collar at each of the bushings 12, 13 these will allow to be retained in axial direction relative to the sections 4, 5.

Figure 6:
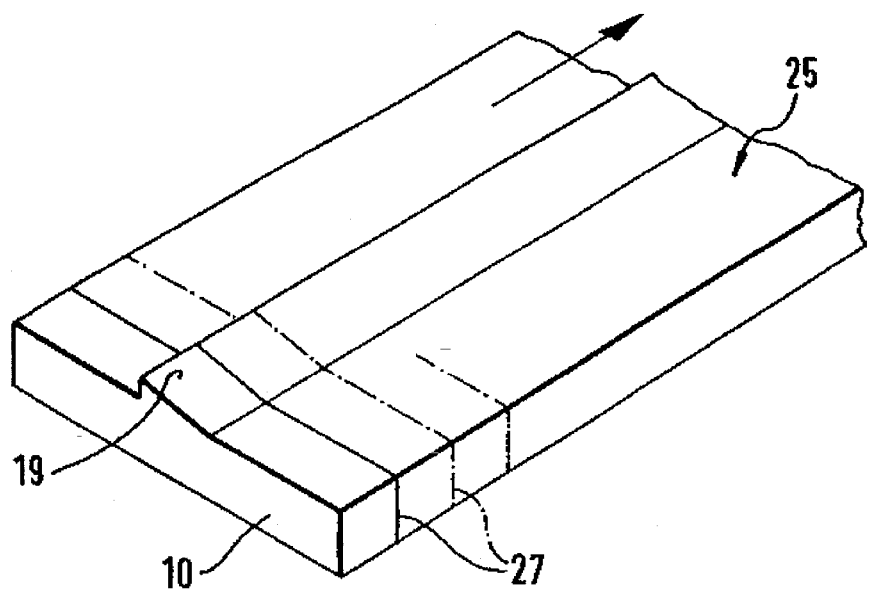
FIG. 6 shows a length of a steel section from which the shaft provided with a wedge will allow to be cut.
Figure 9:
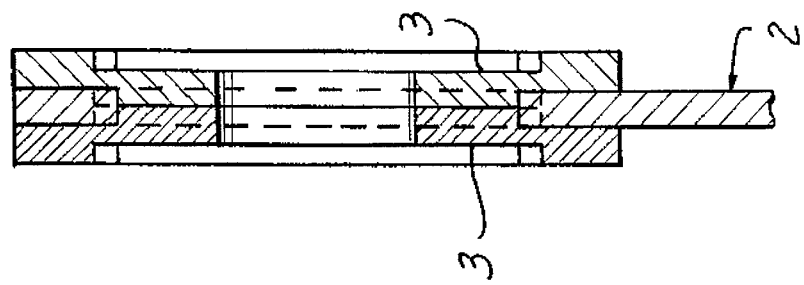
FIG. 9 shows a recess formed as a through opening in the second joint part, where a side of each gear wheel formed with a stamped inward offset projects into the recess of the second joint part.
Figure 8:
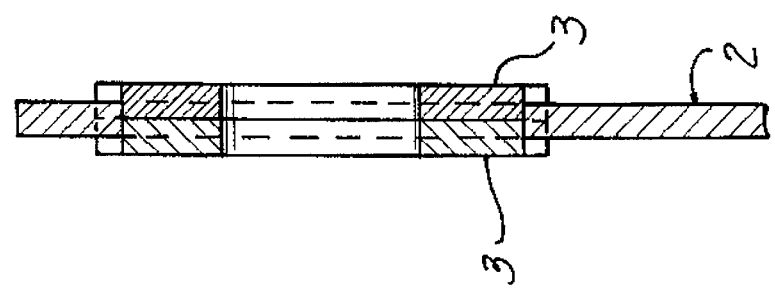
FIG. 8 shows two gear wheels inserted in at least one recess of the second joint part, where the two gear wheels are aligned with each other and positioned preferably symmetrical to the second joint part.
Figure 7:
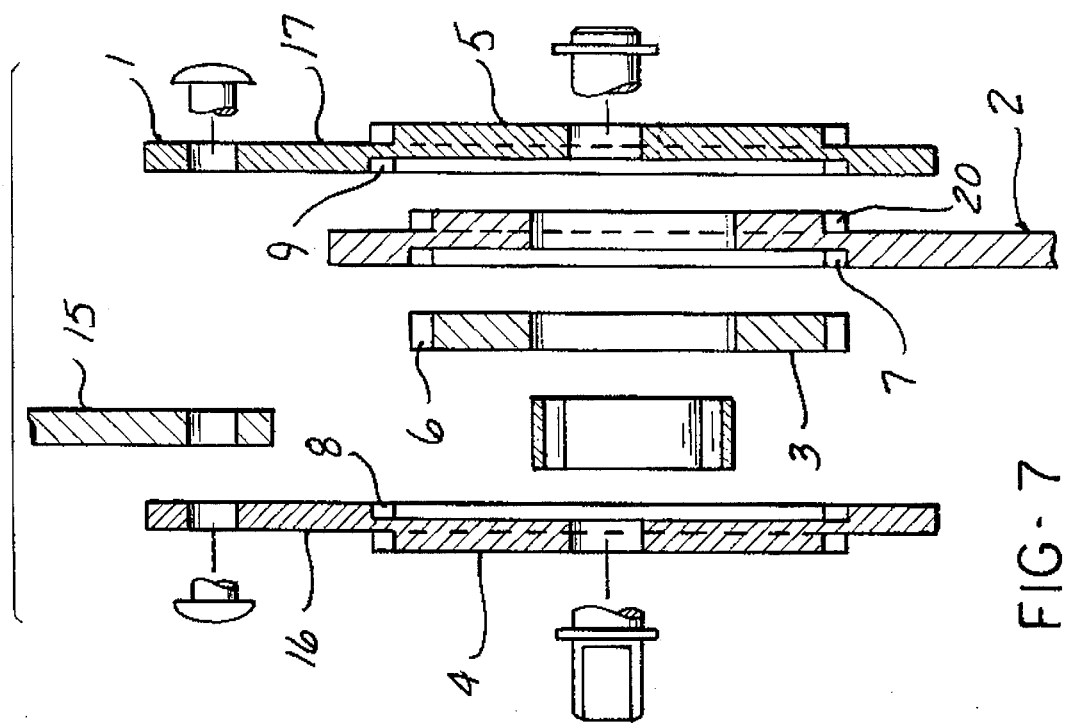
FIG. 7 shows an exploded sectional view of the articulated joint fitting FIG. 1.

FIG. 6 shows a possibility to fabricate a shaft 10 provided with a wedge 19 from a steel section 25 (manufactured by a rolling or a drawing operation) in an inexpensive way by cutting. In this context, the pressed element is fabricated by pressing in the direction of the arrow in FIG. 6, while the subsequent cutting movement takes place normal to that and in each case in a plane which is parallel to the plane 27.

What is claimed is:

1. An articulated joint fitting for automotive vehicle seats comprising:

first and second joint parts rotatable relative to each other, the first joint part having an internal toothing and the second joint part having an external toothing, both the internal toothing and the external toothing engaging each other, the external toothing having a smaller number of teeth and a smaller crown circle diameter than the internal toothing, at least one of the internal toothing and the external toothing defined by first and second toothing portions in the articulated joint fitting and the other of the internal toothing and the external toothing in engagement with both the first and second toothing portions, wherein said second joint part includes a first gear wheel having external toothing extending across a predetermined width of said first gear wheel, such that part of said predetermined width of external toothing of said first gear wheel engages non-rotatably with a corresponding toothed aperture formed in said second joint part and another part of said predetermined width of external toothing of said first gear wheel engages rotatably with said first joint part;

a driving shaft supporting the first joint part; and an eccentric supporting the second joint part.

2. An articulated joint fitting for automotive vehicle seats comprising:

first and second joint parts rotatable relative to each other, the first joint part having internal toothing and the second joint part having external toothing, said internal and external toothing engaging each other, the external toothing having a smaller number of teeth and a smaller crown circle diameter than the internal toothing, said second joint part having a recess;

a driving shaft supporting the first joint part;

an eccentric furnished on said driving shaft and supporting the second joint part;

the external toothing of the second joint part defined by at least two elements, wherein at least one element of said two elements is a first gear wheel, at least said first gear wheel having an external toothing with an outside contour and a width, said first gear wheel inserted in said recess provided in the second joint part, said recess of said second joint part corresponding to the outside contour of the first gear wheel, at least part of the width of said first gear wheel projecting out of the recess of the second joint part and forming at least part of the external toothing of the second joint part.

3. The articulated joint fitting as claimed in claim 1, further comprising:

said recess formed in a first surface of said second joint part corresponding to an outward offset protruding from a second surface of the second joint part.

4. The articulated joint fitting as claimed in claim 3, further comprising:

said outward offset furnished with an external toothing corresponding to the external toothing of the first gear wheel and said external toothing of said outward offset in combination jointly with the toothing of the first gear wheel defining the external toothing of the second joint part.

5. The articulated joint fitting as claimed in claim 1, further comprising:

wherein the other element of said two elements defining the external toothing of the second joint part is a second gear wheel, said first and second gear wheels inserted in at least one recess of the second joint part, the two gear wheels being aligned with each other and being positioned preferably symmertrical to the second joint part.

6. The articulated joint fitting as claimed in claim 5, further comprising:

said recess formed as a through opening in the second joint part.

7. The articulated joint fitting as claimed in claim 6, further comprising:

a side of each gear wheel formed with a stamped inward offset, said stamped inward offset defining the external toothing of said second joint part.

8. The articulated joint fitting as claimed in claim 7, further comprising:

at least one sliding bearing supporting at least the gear wheel of the second joint part on the eccentric.

9. The articulated joint fitting as claimed in claim 7, further comprising:

at least one roller bearing means for supporting at least one of the gear wheel and the second joint part on the eccentric.

10. The articulated joint as claimed in claim 6, further comprising:

a side of each gear wheel formed with a stamped inward offset, said stamped inward offset projecting into the recess of said second joint part.

11. An articulated joint fitting for automotive vehicle seats comprising:

first and second joint parts rotatable relative to each other, the first joint part associated with an internal toothing and the second joint part associated with an external toothing, both the internal and external toothing engaging each other, the external toothing furnished with a smaller number of teeth and having a smaller crown circle diameter than the internal toothing, said second joint part having a recess formed in a first surface;

a driving shaft supporting the first joint part;

an eccentric furnished on the driving shaft and supporting the second joint part, wherein the driving shaft is supported longitudinally slidably and non-rotatably relative to the eccentric;

the external toothing of the second joint part defined by at least first and second members, wherein at least one of said first and second members is a first gear wheel, at least said first gear wheel having an external toothing with an outside contour and a width, said first gear wheel insertable in said recess provided in the second joint part, said recess of said second joint part corresponding to the outside contour of the first gear wheel, at least part of the width of said first gear wheel projecting out of the recess of the second joint part and forming at least part of the external toothing of the second joint part; and means for adjusting the eccentric in response to a longitudinal slide of the driving shaft.

12. The articulated joint fitting as claimed in claim 11, wherein the eccentric adjusting means further comprises:

a wedge coupled to the driving shaft, the wedge interacting with an internal surface of the eccentric associated with the wedge, the internal surface of the eccentric inclined so as to correspond to a slant of the wedge.

13. The articulated joint fitting as claimed in claim 12, further comprising:

the wedge integrally coupled to the shaft, wherein the wedge-and-shaft is cut from a steel section having a cross-sectional surface matching the contour of the shaft and the wedge.

14. The articulated joint fitting as claimed in claim 12, further comprising:

bushings for rotatably supporting said shaft in parts having internal toothing and round outside surfaces, said part further formed with a cutout on an inside surface for accommodation of the shaft while allowing said shaft to slide in longitudinal direction.

15. The articulated joint fitting as claimed in claim 11, further comprising:

the eccentric supported on the driving shaft with a play in a radial direction.

16. The articulated joint fitting as claimed in claim 11, further comprising:

the driving shaft having a rectangular cross-sectional surface.

17. The articulated joint fitting as claimed in claim 11, further comprising:

spring means for urging the driving shaft in a direction to maintain the shaft in a force-locking engagement with the eccentric.

18. The articulated joint fitting of claim 11 wherein said recess in said first surface of said second joint part forms a corresponding projection out of an opposite second surface of said second joint part, said projection defining at least a portion of said external toothing of said second joint part.

19. An articulated joint fitting for automotive vehicle seats comprising:

first and second joint parts rotatable relative to each other, the first joint part having an internal toothing and the second joint part having an external toothing, both the internal toothing and the external toothing engaging each other, the external toothing having a smaller number of teeth and a smaller crown circle diameter than the internal toothing, at least one of the internal toothing and the external toothing defined by first and second toothing portions in the articulated joint fitting and the other of the internal toothing and the external toothing in engagement with both the first and second toothing portions, said second joint part having a recess formed therein;

a driving shaft supporting the first joint part;

an eccentric supporting the second joint part; and the external toothing of the second joint part defined by at least two elements, wherein at least one element of said two elements is a first gear wheel, at least said first gear wheel having an external toothing with an outside contour and a width, said first gear wheel inserted in said recess provided in the second joint part, said recess of said second joint part corresponding to the outside contour of the first gear wheel, at least part of the width of said first gear wheel projecting out of the recess of the second joint part and forming at least part of the external toothing of the second joint part.

20. The articulated joint fitting as claimed in claim 19, further comprising:

the first and second joint parts at least one of an internal toothing and an external rotatable with respect to one another and braced against each other.

21. The articulated joint fitting as claimed in claim 20, further comprising:

means for rotatably mounting the first and second joint parts against each other with predetermined torque, and slightly braced in axial direction in order to couple the first and second joint parts to each other after rotating the driving shaft by at least 360 degrees.

22. An articulated joint fitting for automotive vehicle seats comprising:

first and second joint parts rotatable relative to each other, the first joint part having internal toothing and the second joint having part external toothing, said internal and external toothing engaging each other, the external toothing having a smaller number of teeth and a smaller crown circle diameter than the internal toothing, said second joint part having a toothed aperture formed therein;

a driving shaft supporting the first joint part;

an eccentric furnished on said driving shaft supporting the second joint part;

the external toothing of the second joint part defined by an assembly of at least two elements, wherein at least one element of said two elements is a first gear wheel having external toothing extending across a predetermined width of said first gear wheel, such that part of said predetermined width of external toothing of said first gear wheel engages non-rotatably with said toothed aperture formed in the other of said two elements defining said second joint part and another part of said predetermined width of external toothing of said first gear wheel engages with said first joint part.

23. An articulated joint fitting for automotive vehicle seats comprising:

first and second joint parts rotatable relative to each other, the first joint part associated with an internal toothing and the second joint part associated with an external toothing, both internal and external toothing engaging each other, the external toothing furnished with a smaller number of teeth and having a smaller crown circle diameter than the internal toothing, said second joint part having a toothed aperture formed therein;

a driving shaft supporting the first joint part;

eccentric furnished on the driving shaft supporting the second joint part, wherein the driving shaft is supported longitudinally slidably and non-rotatably relative to the eccentric;

the external toothing of the second joint part defined by at least two elements, wherein at least one element of said two elements is a first gear wheel, at least said first gear wheel having an external toothing with an outside contour and a width, said first gear wheel inserted non-rotatably in said toothed aperture provided in the second joint part, said toothed aperture of said second joint part corresponding to the outside contour of the first gear wheel, at least part of the width of said first gear wheel projecting out of the recess of the second joint part and forming at least part of the external toothing of the second joint part; and means for adjusting the eccentric in response to a longitudinal slide of the driving shaft.

* * * * *